(12) United States Patent
Suzuki (10) Patent No.: US 12,191,527 B2
(45) Date of Patent: Jan. 7, 2025

(54) BATTERY MODULE

(71) Applicant: Vehicle Energy Japan Inc., Hitachinaka (JP)

(72) Inventor: Takashi Suzuki, Hitachinaka (JP)

(73) Assignee: Vehicle Energy Japan Inc., Hitachinaka (JP)

(*) Notice: Subject to any disclaimer, the term of this patent is extended or adjusted under 35 U.S.C. 154(b) by 752 days.

(21) Appl. No.: 17/059,904

(22) PCT Filed: Mar. 8, 2019

(86) PCT No.: PCT/JP2019/009510
§ 371 (c)(1),
(2) Date: Nov. 30, 2020

(87) PCT Pub. No.: WO2020/035970
PCT Pub. Date: Feb. 20, 2020

(65) Prior Publication Data
US 2021/0226304 A1 Jul. 22, 2021

(30) Foreign Application Priority Data
Aug. 13, 2018 (JP) .................................. 2018-152504

(51) Int. Cl.
*H01M 50/522* (2021.01)
*H01M 50/209* (2021.01)
(Continued)

(52) U.S. Cl.
CPC ....... *H01M 50/522* (2021.01); *H01M 50/209* (2021.01); *H01M 50/50* (2021.01);
(Continued)

(58) Field of Classification Search
CPC .. H01M 50/522; H01M 50/50; H01M 50/209; H01M 50/51
See application file for complete search history.

(56) References Cited

U.S. PATENT DOCUMENTS

2003/0170535 A1* 9/2003 Watanabe ........... H01M 50/507
429/162
2010/0247997 A1 9/2010 Hostler et al.
(Continued)

FOREIGN PATENT DOCUMENTS

| CN | 101952924 A | 1/2011 |
|---|---|---|
| CN | 106356490 A | 1/2017 |

(Continued)

OTHER PUBLICATIONS

International Search Report (PCT/ISA/210) issued in PCT Application No. PCT/JP2019/009510 dated May 28, 2019 with English translation (five (5) pages).
(Continued)

*Primary Examiner* — Olatunji A Godo
(74) *Attorney, Agent, or Firm* — Crowell & Moring LLP (57) ABSTRACT

An object of the present disclosure is to provide a battery module including a plurality of battery groups each having a plurality of battery cells connected in parallel, the plurality of battery groups being connected in series by bus bars, for which a clad material is not used and thus dissimilar metal welding can be avoided. To achieve the object, a first bus bar 20P mainly contains aluminum and is connected to positive electrode terminals of a plurality of battery cells 1 of each battery group 10 via welding joint portions W1. A second bus bar 20N mainly contains copper and is connected to negative electrode terminals of the plurality of battery cells 1 of each battery group 10 via welding joint portions W2. The first bus bar 20P of one of the mutually adjacent battery groups 10 of the plurality of battery groups 10 is connected to the second bus bar 20N of the other battery group 10 via a mechanical joint portion M.

8 Claims, 8 Drawing Sheets

(51) Int. Cl.
*H01M 50/50* (2021.01)
*H01M 50/51* (2021.01)
*H01M 50/562* (2021.01)

(52) U.S. Cl.
CPC ......... *H01M 50/51* (2021.01); *H01M 50/562* (2021.01); *H01M 2220/20* (2013.01)

(56) References Cited

U.S. PATENT DOCUMENTS

| | | |
|---|---|---|
| 2010/0248010 A1 | 9/2010 | Butt et al. |
| 2011/0159350 A1 | 6/2011 | Ochi |
| 2015/0140409 A1 | 5/2015 | Sakurai |
| 2017/0018794 A1 | 1/2017 | Lee et al. |
| 2019/0074490 A1* | 3/2019 | Ishimaru ............. H01M 50/507 |

FOREIGN PATENT DOCUMENTS

| | | |
|---|---|---|
| JP | 2008-123800 A | 5/2008 |
| JP | 2010-103053 A | 5/2010 |
| JP | 2011-138651 A | 7/2011 |
| JP | 2012-515418 A | 7/2012 |
| JP | 2016-115458 A | 6/2016 |
| WO | WO 2012/118014 A1 | 9/2012 |
| WO | WO 2017/130705 A1 | 8/2017 |

OTHER PUBLICATIONS

Japanese-language Written Opinion (PCT/ISA/237) issued in PCT Application No. PCT/JP2019/009510 dated May 28, 2019 (three (3) pages).
European Office Action issued in European Application No. 19 849 677.0 dated Aug. 9, 2023 (4 pages).
Extended European Search Report issued in European Application No. 19849677.0 dated Apr. 19, 2022 (seven(7) pages).
Chinese-language Office Action issued in Chinese Application No. 201980036370.1 dated Jun. 8, 2022 (nine (9) pages).
European Office Action issued in European Application No. 19 849 677.0 dated Jan. 12, 2024 (4 pages).

* cited by examiner

BATTERY MODULE

TECHNICAL FIELD

The present disclosure relates to battery modules.

BACKGROUND ART

Conventionally, an invention related to an energy storage module is known (see Patent Literature 1 below). The invention described in Patent Literature 1 discloses the following configuration to solve a problem that welding defects, such as cracks, may be occur in a weld metal for a bus bar and an electrode terminal, which may result in lower joint strength (for example, see paragraph 0005, paragraph 0006, and claim 1 of Patent Literature 1).

The energy storage module includes a plurality of energy storage devices that are electrically connected by bus bars. Each bus bar includes a first conductive plate and a second conductive plate. The first conductive plate includes a first electrode joint portion, which is joined to an electrode terminal of a first energy storage device by welding, and a first abutment portion arranged in upright position on the first electrode joint portion. The second conductive plate includes a second electrode joint portion, which is joined to an electrode terminal of a second storage device arranged adjacent to the first energy storage device by welding, and a second abutment portion arranged in upright position on the second electrode joint portion. In the energy storage module, the first abutment portion of the first conductive plate and the second abutment portion of the second conductive plate are joined together.

According to the invention described in Patent Literature 1 with the aforementioned configuration, even when the tolerance of the outer shape is large and a position displacement in the height direction occurs between adjacent electrode terminals of battery cells that are connected by a bus bar, a high joint strength can be secured for the welded portion of the bus bar and the electrode terminals. Further, since the abutment portions arranged in upright position on the electrode joint portions are joined together, high workability is ensured (for example, see paragraph 0046 of Patent Literature 1).

CITATION LIST

Patent Literature

Patent Literature 1: JP 2016-115458 A

SUMMARY OF INVENTION

Technical Problem

Typically, dissimilar metal welding for welding different materials together requires a high level of technique. In the aforementioned conventional energy storage module, when the first conductive plate is made of an aluminum-based metal and the second conductive plate is made of a composite material (i.e., a clad material) of a copper-based metal and an aluminum-based metal, it is possible to avoid dissimilar metal welding between the first conductive plate and the second conductive plate (for example, see paragraph 0030 of Patent Literature 1).

However, when a plurality of battery groups each obtained by connecting a plurality of battery cells in parallel are prepared and are connected in series, it would be necessary to use bus bars that are longer than the conventional bus bars and can connect all of the battery cells of the two adjacent battery groups. When a clad material is used for such bus bars that are longer than the conventional bus bars, problems in production and cost may arise.

The present disclosure provides a battery module including a plurality of battery groups each having a plurality of battery cells connected in parallel, the plurality of battery groups being connected in series by bus bars, for which a clad material is not used and thus dissimilar metal welding can be avoided.

Solution to Problem

According to an aspect of the present disclosure, there is provided a battery module including a plurality of battery groups, in which each battery group includes a plurality of battery cells, a first bus bar, and a second bus bar, the first bus bar and the second bus bar being adapted to connect the plurality of battery cells in parallel, each battery cell includes a positive electrode terminal mainly containing aluminum and a negative electrode terminal mainly containing copper, the first bus bar mainly contains aluminum and is connected to the positive electrode terminals of the plurality of battery cells of each battery group via welding joint portions, the second bus bar mainly contains copper and is connected to the negative electrode terminals of the plurality of battery cells of each battery group via welding joint portions, and the plurality of battery groups are connected in series as a result of the first bus bar of one of the mutually adjacent battery groups being connected to the second bus bar of the other battery group via a mechanical joint portion.

Advantageous Effects of Invention

According to the aforementioned aspect of the present disclosure, a plurality of battery cells of a single battery group can be connected in parallel by a single first bus bar mainly containing aluminum and a single second bus bar mainly containing copper, via a plurality of welding joint portions each adapted to weld similar metals together. In addition, the first bus bar and the second bus bar mainly containing dissimilar metals are connected via a mechanical joint portion so that the plurality of battery groups can be connected in series without using a clad material and thus avoiding dissimilar metal welding. That is, according to the aforementioned aspect of the present disclosure, it is possible to provide a battery module including a plurality of battery groups each having a plurality of battery cells connected in parallel, the plurality of battery groups being connected in series by bus bars, for which a clad material is not used and thus dissimilar metal welding can be avoided.

DESCRIPTION OF EMBODIMENTS

Hereinafter, embodiments of a battery module according to the present disclosure will be described with reference to the drawings.

Figure 1:
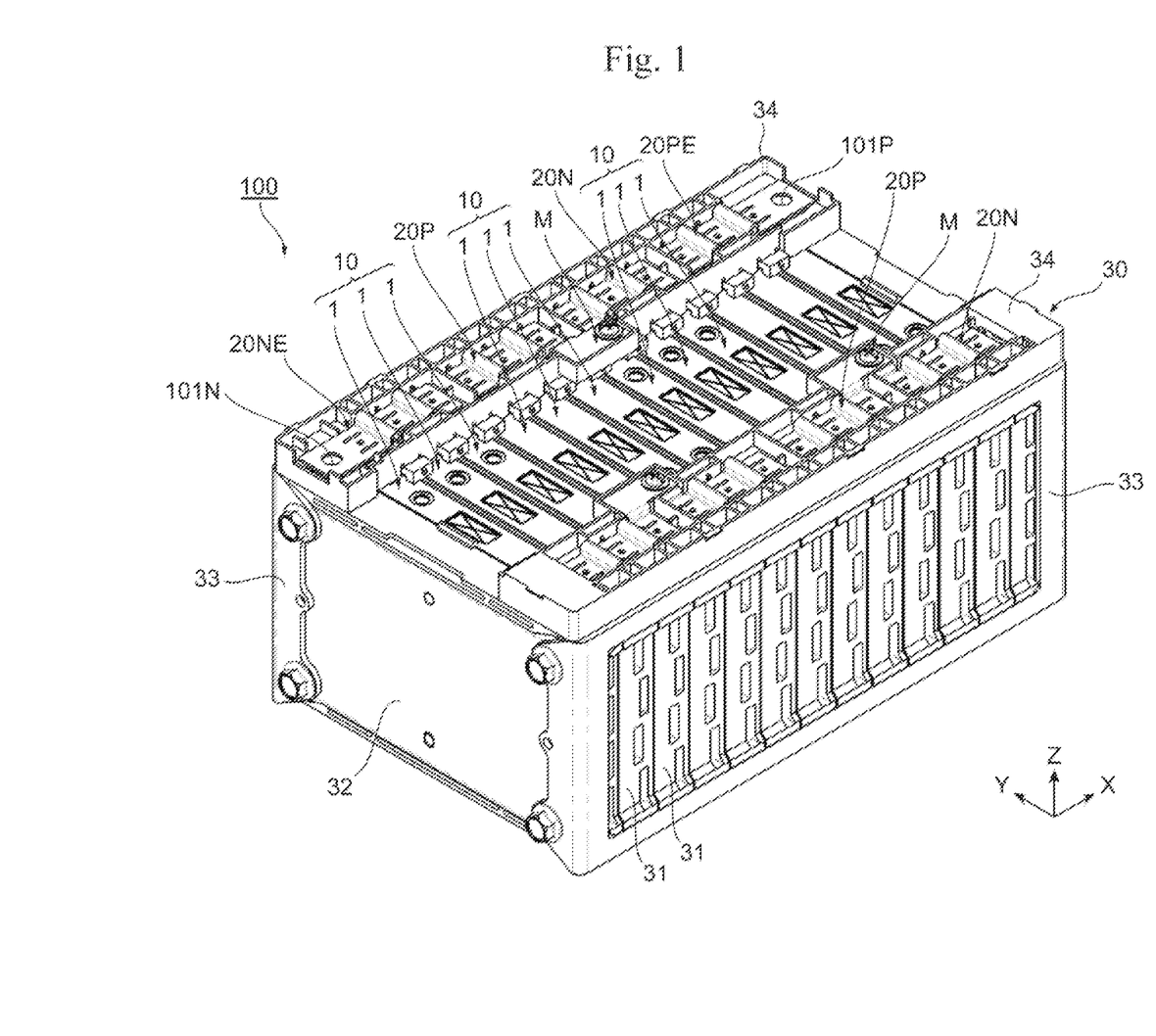
FIG. 1 is a perspective view of a battery module according to an embodiment of the present disclosure.
Figure 2:
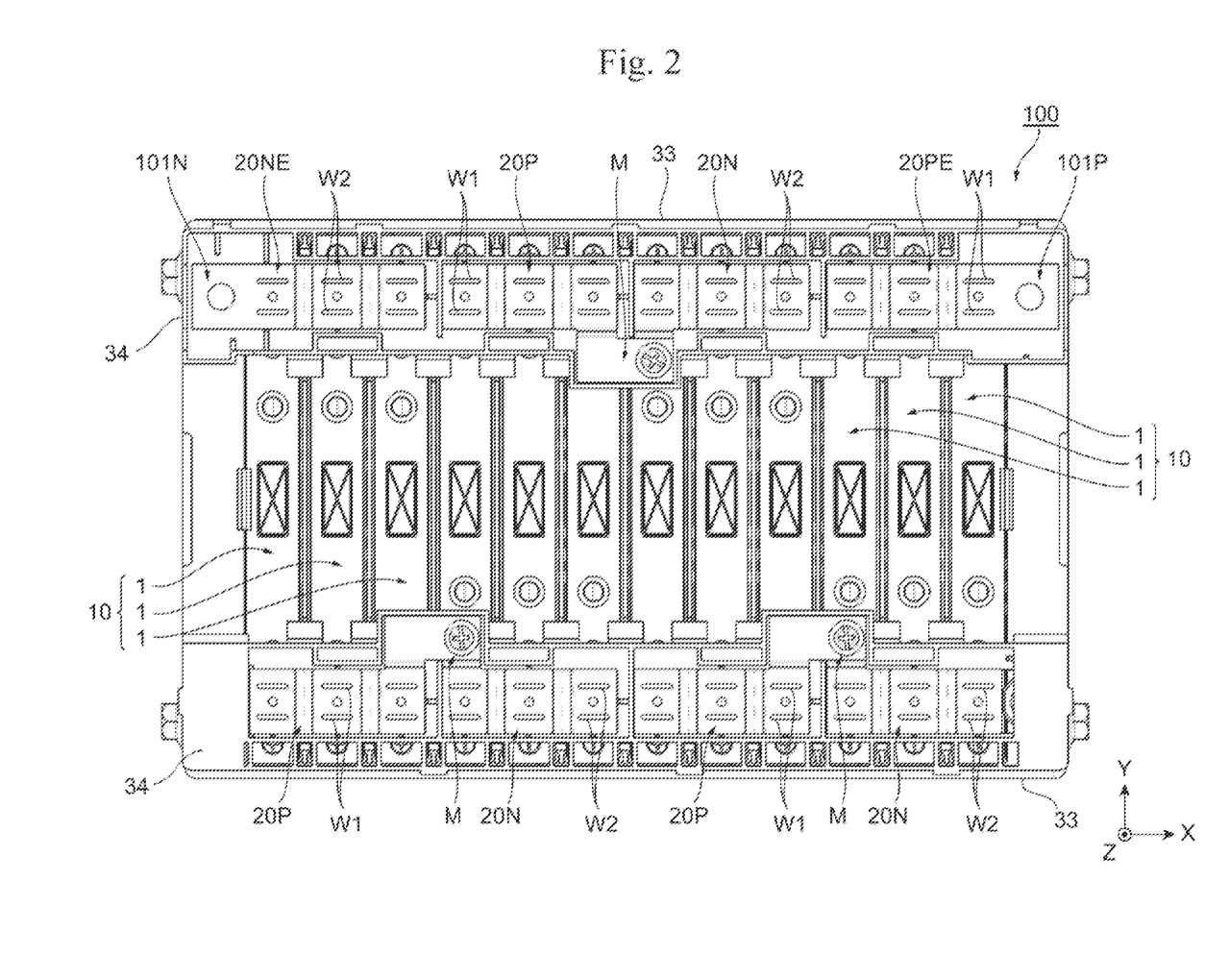
FIG. 2 is a plan view of the battery module illustrated in FIG. 1.
Figure 3:
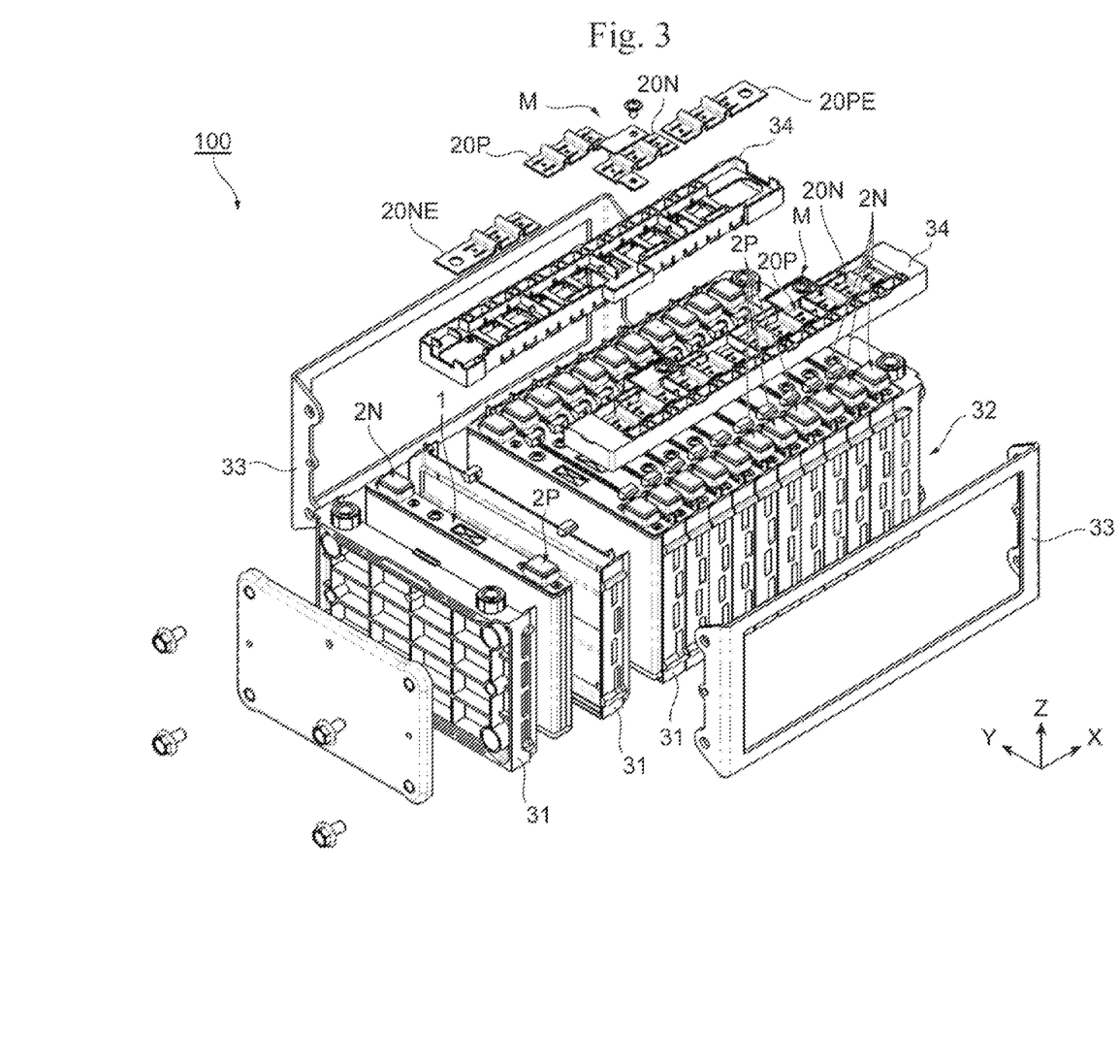
FIG. 3 is an exploded perspective view of the battery module illustrated in FIG. 1.
Figure 4:
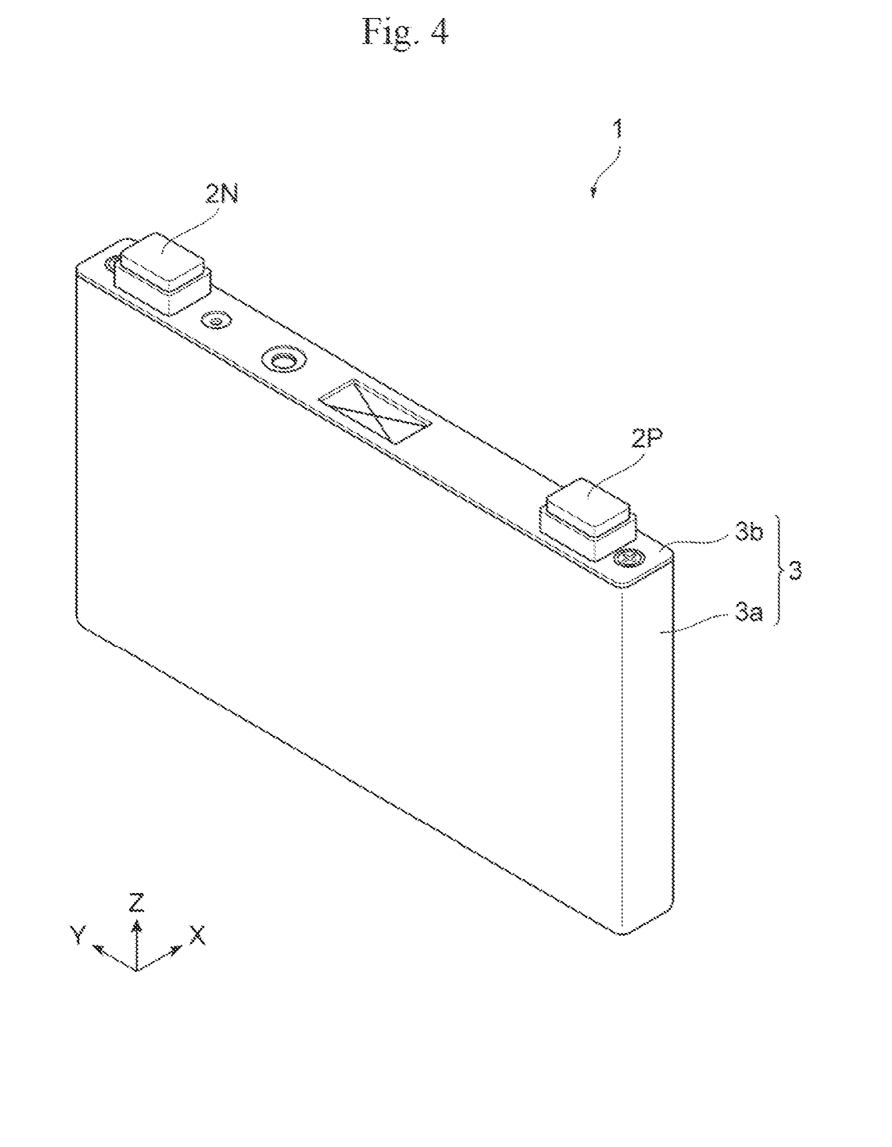
FIG. 4 is a perspective view of a battery cell of the battery module illustrated in FIG. 3.
Figure 5:
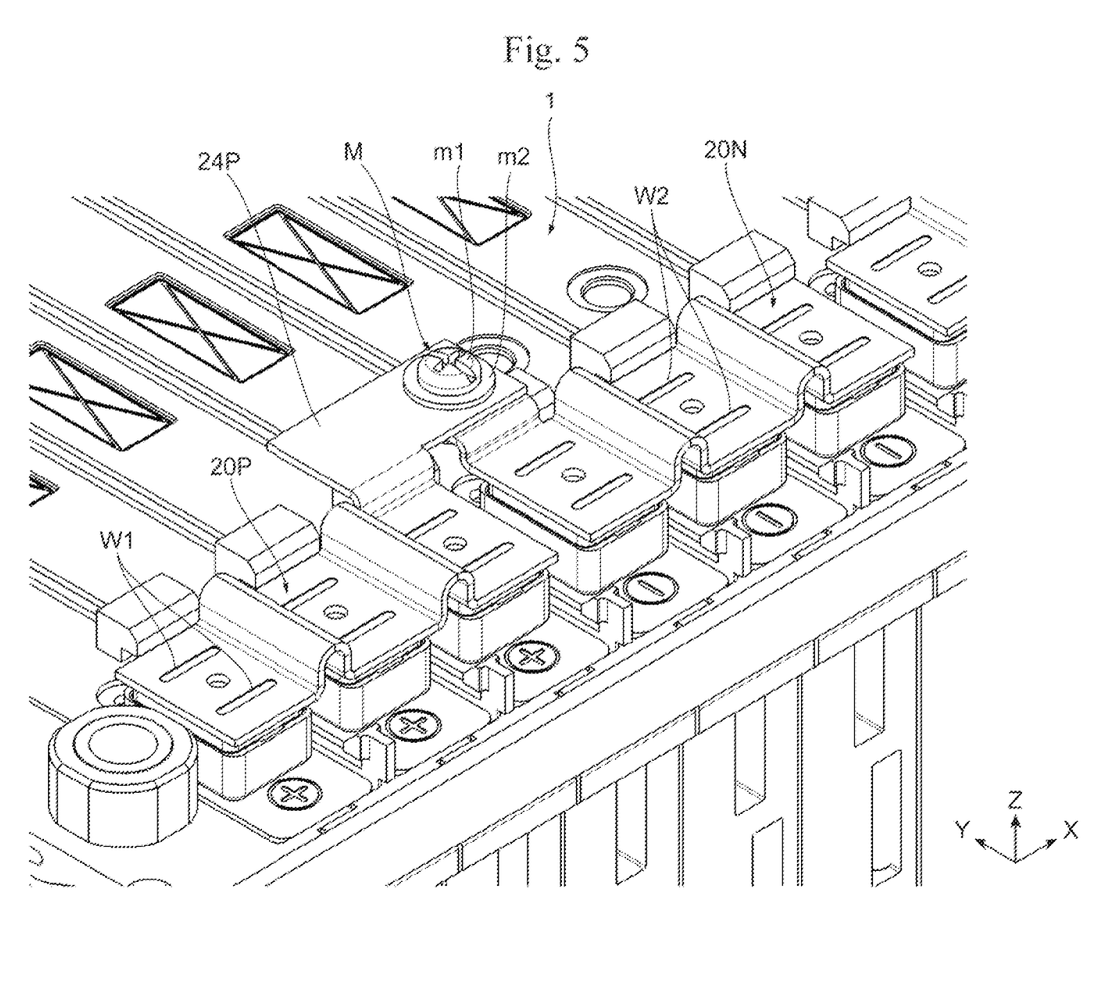
FIG. 5 is an enlarged view of a region around a mechanical joint portion between battery groups of the battery module illustrated in FIG. 1.

FIG. 1 is a perspective view of a battery module 100 according to an embodiment of the present disclosure. FIG. 2 is a plan view of the battery module 100 illustrated in FIG. 1. FIG. 3 is an exploded perspective view of the battery module 100 illustrated in FIG. 1. FIG. 4 is a perspective view of a battery cell 1 of the battery module 100 illustrated in FIG. 3. FIG. 5 is an enlarged view of a region around a mechanical joint portion M between the battery groups 10 of the battery module 100 illustrated in FIG. 1.

Hereinafter, the configuration of the battery module 100 will be sometimes described using an XYZ orthogonal coordinate system including the X-axis, Y-axis, and Z-axis that are parallel with the thickness direction, width direction, and height direction, respectively, of the battery cells 1. The thickness direction, width direction, and height direction of the battery cells 1 may also be simply denoted by the "thickness direction (i.e., X-axis direction)," "width direction (i.e., Y-axis direction)," and "height direction (i.e., Z-axis direction)," respectively. In the following description, directions, such as upper and lower (or top and bottom), left and right, and longitudinal and lateral, are used only for convenience sake to describe the configuration of the battery module 100, and do not limit the orientation of the battery module 100 during use.

The battery module 100 of the present embodiment constitutes an on-vehicle energy storage device that is mounted on a vehicle, such as an electric vehicle (EV), a hybrid vehicle (HV), or a plug-in hybrid vehicle (PHV), for example. The battery module 100 of the present embodiment has the following configuration, for example, though the details will be described later.

The battery module 100 includes a plurality of battery groups 10. Each battery group 10 includes a plurality of battery cells 1, and a first bus bar 20P and a second bus bar 20N that are adapted to connect the plurality of battery cells 1 in parallel. Each battery cell 1 includes a positive electrode terminal 2P mainly containing aluminum and a negative electrode terminal 2N mainly containing copper. The first bus bar 20P mainly contains aluminum and is connected to the positive electrode terminals 2P of the plurality of battery cells 1 of each battery group 10 via welding joint portions W1. The second bus bar 20N mainly contains copper and is connected to the negative electrode terminals 2N of the plurality of battery cells 1 of each battery group 10 via welding joint portions W2. The plurality of battery groups 10 are connected in series as a result of the first bus bar 20P of one of the mutually adjacent battery groups 10 being connected to the second bus bar 20N of the other battery group 10 via a mechanical joint portion M.

Hereinafter, the configuration of each portion of the battery module 100 of the present embodiment will be described in detail. The battery module 100 of the present embodiment includes the aforementioned plurality of battery groups 10, a housing 30, and a circuit board (not illustrated), for example. Each battery group 10 includes the plurality of battery cells 1, the first bus bar 20P, and the second bus bar 20N as described above. It should be noted that among the plurality of battery groups 10, the battery groups 10 arranged at opposite ends in the stacked direction (i.e., X-axis direction) of the battery cells 1 have a first end bus bar 20PE and a second end bus bar 20NE, respectively, instead of the first bus bar 20P and the second bus bar 20N.

The battery cells 1 are rectangular secondary battery cells in a flat rectangular shape, for example. More specifically, the battery cells 1 are rectangular lithium ion secondary battery cells. Each battery cell 1 has the positive electrode terminal 2P and the negative electrode terminal 2N arranged at opposite ends in the width direction (i.e., Y-axis direction) orthogonal to the thickness direction (i.e., X-axis direction) on an end face of the battery cell 1 along the thickness direction. More specifically, the battery cell 1 includes the positive electrode terminal 2P, the negative electrode terminal 2N, and a battery cell container 3. Though not illustrated, the battery cell 1 also includes an electrode group, current collectors, an insulating member, an electrolytic solution, and the like housed in the battery cell container 3.

The battery cell container 3 is hermetically sealed by welding a rectangular plate-like cell lid 3b to the entire periphery of an opening of a closed-bottomed rectangular tube-shaped cell can 3a. The battery cell container 3 has a flat rectangular shape, that is, a thin rectangular parallelepiped or hexahedron having a dimension in the thickness direction (i.e., X-axis direction) smaller than dimensions in the width direction (i.e., Y-axis direction) and the height direction (i.e., Z-axis direction). Among the faces of the battery cell container 3 of the battery cell 1, a pair of wide side faces facing the thickness direction (i.e., X-axis direction) of the battery cell 1 each have the largest area, and a pair of narrow side faces facing the width direction (i.e., Y-axis direction) of the battery cell 1 each have the smallest area.

The positive electrode terminal 2P and the negative electrode terminal 2N, which are external terminals of the battery cell 1, are arranged on one of a pair of narrow side faces that face the height direction (i.e., Z-axis direction) of the battery cell container 3 and are along the thickness direction (i.e., X-axis direction). The positive electrode terminal 2P and the negative electrode terminal 2N are arranged at opposite ends in the longitudinal direction of the rectangular cell lid 3b, that is, in the width direction (i.e., Y-axis direction) of the battery cell 1. Each of the positive electrode terminal 2P and the negative electrode terminal 2N has a stereoscopic shape of a generally rectangular parallelepiped protruding in the height direction (i.e., Z-axis direction) from the upper face of the cell lid 3b. Resin insulating members are provided to electrically insulate the positive electrode terminal 2P and the negative electrode terminal 2N from the battery cell container 3, and the current collectors and the electrode group from the battery cell container 3.

The positive electrode terminal 2P is formed using aluminum or a material mainly containing aluminum, such as aluminum alloy, for example. The negative electrode terminal 2N is formed using copper or a material mainly containing copper, such as copper alloy, for example. The positive electrode terminal 2P and the negative electrode terminal 2N are connected to the current collectors of the positive electrode and the negative electrode, respectively, housed in the battery cell container 3 and are connected to the positive electrode and the negative electrode, respectively, of the electrode group via the respective current collectors.

The plurality of battery cells 1 of each battery group 10 are stacked and arranged in the same orientation along the thickness direction (i.e., X-axis direction) such that the plurality of positive electrode terminals 2P and the plurality of negative electrode terminals 2N are each aligned along the thickness direction (i.e., X-axis direction). Meanwhile, the plurality of battery groups 10 of the battery module 100 are stacked and arranged while being alternately inverted along the thickness direction (i.e., X-axis direction) such that the plurality of positive electrode terminals 2P and the plurality of negative electrode terminals 2N are alternately arranged along the thickness direction (i.e., X-axis direction).

In the present embodiment, each battery group 10 includes three battery cells 1. Three respective positive electrode terminals 2P of the three battery cells 1 of each battery group 10 are aligned in the thickness direction (i.e., X-axis direction) at ends of the battery cells 1 in one side of the width direction (i.e., Y-axis direction). Meanwhile, three respective negative electrode terminals 2N of the three battery cells 1 of each battery group 10 are aligned in the thickness direction (i.e., X-axis direction) at ends of the battery cells 1 in one side of the width direction (i.e., Y-axis direction) on the side opposite to the positive electrode terminals 2P. It should be noted that the number of the battery cells 1 of each battery group 10 is not particularly limited, and may be two or more than three.

Among the plurality of battery groups 10 stacked and arranged in the thickness direction (i.e., X-axis direction) of the battery cells 1, two adjacent battery groups 10 have opposite arrangements of the positive electrode terminals 2P and the negative electrode terminals 2N of the battery cells 1 in the width direction (i.e., Y-axis direction). In the present embodiment, the battery module 100 includes four battery groups 10. The four battery groups 10 are stacked and arranged while being alternately inverted in the thickness direction (i.e., X-axis direction) such that three positive electrode terminals 2P and three negative electrode terminals 2N are alternately arranged in the thickness direction (i.e., X-axis direction). It should be noted that the number of the battery groups 10 of the battery module 100 is not particularly limited, and may be two, three, or more than four.

Figure 6:
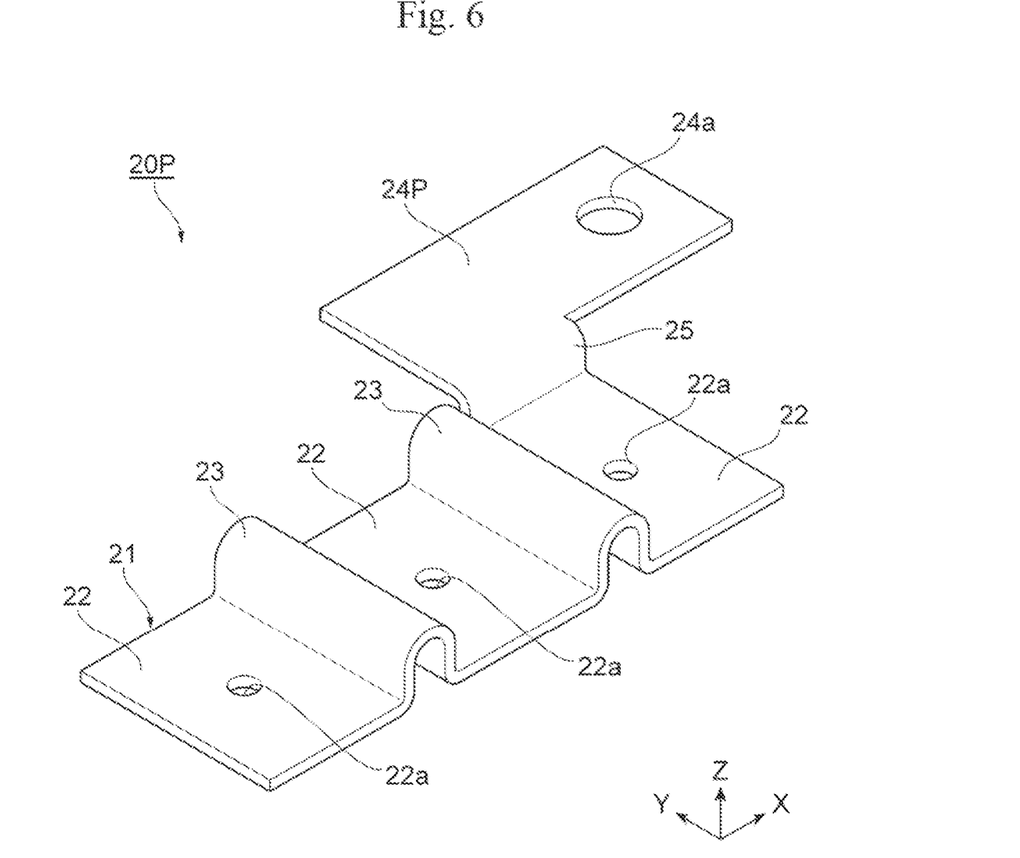
FIG. 6 is a perspective view of a first bus bar on which the mechanical joint portion illustrated in FIG. 5 is provided.
Figure 7:
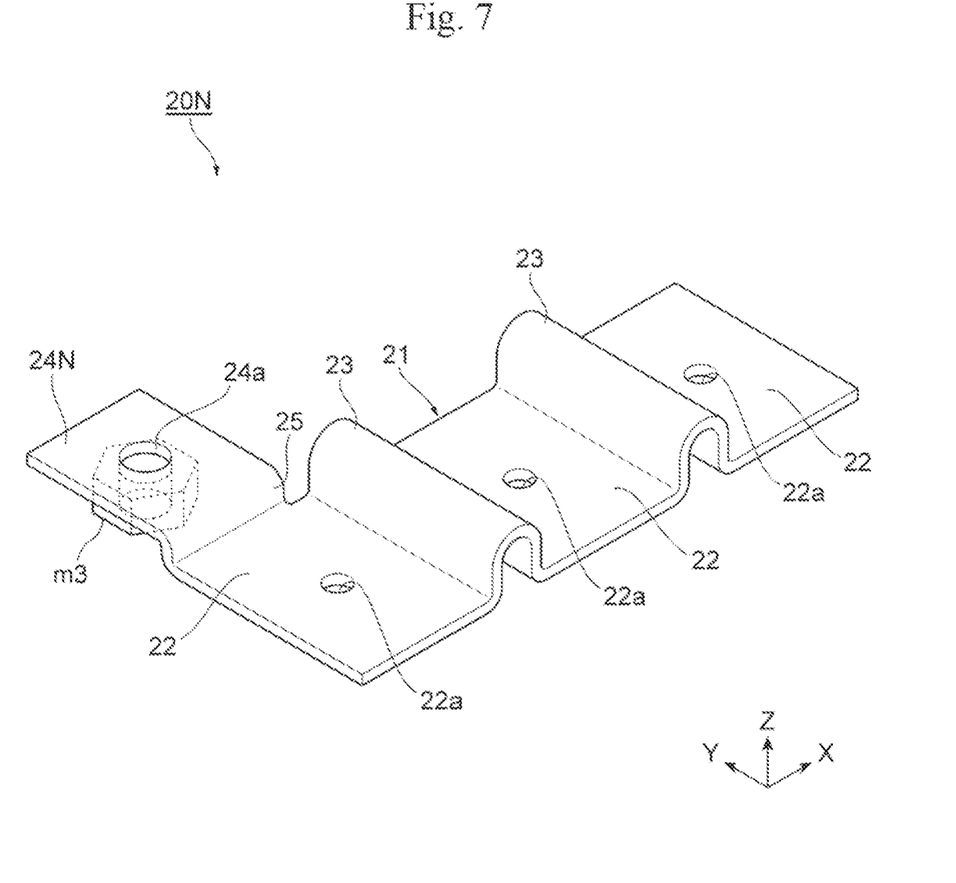
FIG. 7 is a perspective view of a second bus bar on which the mechanical joint portion illustrated in FIG. 5 is provided.
Figure 8A:
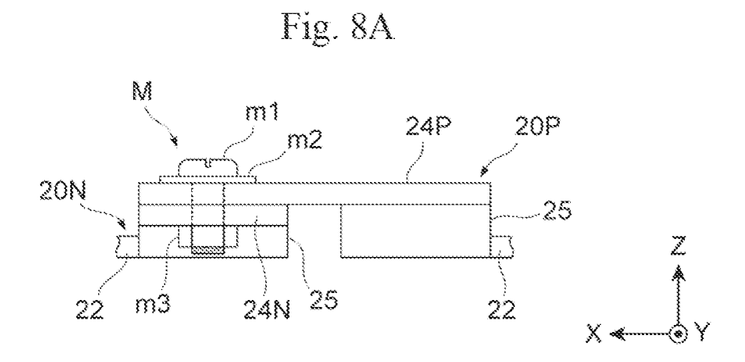
FIG. 8A is a side view of the mechanical joint portion illustrated in FIG. 5.

FIG. 6 is a perspective view of the first bus bar 20P adapted to be connected to the second bus bar 20N via the mechanical joint portion M illustrated in FIG. 5. FIG. 7 is a perspective view of the second bus bar 20N adapted to be connected to the first bus bar 20P via the mechanical joint portion M illustrated in FIG. 5. FIG. 8A is a side view of the mechanical joint portion M illustrated in FIG. 5 as seen from the width direction (i.e., Y-axis direction) of the battery cells 1.

The first bus bar 20P and the second bus bar 20N of each battery group 10 are plate-like conductive metal members adapted to connect the plurality of battery cells 1 of each battery group 10 in parallel. The first bus bar 20P is formed using aluminum or a material mainly containing aluminum, such as aluminum alloy, for example. The second bus bar 20N is formed using copper or a material mainly containing copper, such as copper alloy, for example. That is, the first bus bar 20P and the second bus bar 20N are formed using metals similar to those of the positive electrode terminal 2P and the negative electrode terminal 2N, respectively, of each battery cell 1 and thus have excellent weldability to the positive electrode terminal 2P and the negative electrode terminal 2N, respectively.

The first bus bar 20P is connected to the positive electrode terminals 2P of the plurality of battery cells 1 of each battery group 10 via the welding joint portions W1. The second bus bar 20N is connected to the negative electrode terminals 2N of the plurality of battery cells 1 of each battery group 10 via the welding joint portions W2. That is, the first bus bar 20P and the second bus bar 20N are electrically connected to the positive electrode terminals 2P and the negative electrode terminals 2N, respectively, via the welding joint portions W1 and W2 each adapted to weld similar metals together and having excellent weldability. The first bus bar 20P of one of the mutually adjacent battery groups 10 and the second bus bar 20N of the other battery group 10 are connected via the mechanical joint portion M.

Each of the first bus bar 20P and the second bus bar 20N has a plate-like shape having a longitudinal direction along the thickness direction (i.e., X-axis direction) of the battery cells 1 and having a short direction along the width direction (i.e., Y-axis direction) of the battery cells 1. The first bus bar 20P and the second bus bar 20N are connected to end faces of the plurality of positive electrode terminals 2P and end faces of the plurality of negative electrode terminals 2N, respectively, via the welding joint portions W1 and W2 in the height direction (i.e., Z-axis direction) orthogonal to the thickness direction (i.e., X-axis direction) and the width direction (Y-axis direction) of the battery cells 1. The first bus bar 20P and the second bus bar 20N have the mechanical joint portion M at their ends adjacent to each other in the longitudinal direction (i.e., X-axis direction).

The first bus bar 20P has a body 21 extending from the positive electrode terminal 2P of the battery cell 1 arranged at one end of the plurality of battery cells 1 of each battery group 10 in the stacked direction (i.e., X-axis direction) of the battery cells 1 to the positive electrode terminal 2P of the battery cell 1 arranged at the other end. Similarly, the second bus bar 20N has a body 21 extending from the negative electrode terminal 2N of the battery cell 1 arranged at one end of the plurality of battery cells 1 of each battery group 10 in the stacked direction (i.e., X-axis direction) of the battery cells 1 to the negative electrode terminal 2N of the battery cell 1 arranged at the other end.

The body 21 has a rectangular plate-like shape having a longitudinal direction along the thickness direction (i.e., X-axis direction) of the battery cells 1 and having a short direction along the width direction (i.e., Y-axis direction) of the battery cells 1 in a plan view seen from the height direction (i.e., Z-axis direction) of the battery cells 1. The body 21 has a plurality of flat portions 22 and a plurality of curved portions 23. Each flat portion 22 is a flat, rectangular plate-like portion that faces the positive electrode terminal 2P or the negative electrode terminal 2N of the battery cell 1 and is adapted to be joined to the positive electrode terminal 2P or the negative electrode terminal 2N of the battery cell 1 via the welding joint portions W1 or the welding joint portions W2, and has a through-hole 22a in the center.

Each curved portion 23 is a curved portion provided between the adjacent flat portions 22. The curved portion 23 is bent in the direction away from the battery cells 1 at an angle of about 90 degrees, for example, in the thickness direction of the flat portions 22, that is, in the height direction (i.e., Z-axis direction) of the battery cells 1 from the flat portions 22 on the opposite sides. In addition, the curved portion 23 has a portion bent in a semicylindrical shape between the portions bent at an angle of about 90 degrees with respect to the flat portions 22 on the opposite sides. Accordingly, the curved portion 23 has a U curved shape in a side view seen from the short direction of the body 21, that is, the width direction (i.e., Y-axis direction) of the battery cells 1.

In the present embodiment, the first bus bar 20P and the second bus bar 20N also have bypass portions 24P and 24N, respectively, which extend inward along the width direction (i.e., Y-axis direction) of the battery cells 1, at their ends adjacent to each other in the longitudinal direction (i.e., X-axis direction). The first bus bar 20P and the second bus bar 20N are connected via the mechanical joint portion M at their respective bypass portions 24P and 24N.

The bypass portion 24P of the first bus bar 20P extends inward from an end on the inner side of the flat portion 22 in the width direction (i.e., Y-axis direction) of the battery cell 1 at an end of the body 21 adjacent to the second bus bar 20N. The bypass portion 24P of the first bus bar 20P extends toward the second bus bar 20N beyond the end of the body 21 adjacent to the second bus bar 20N, in the stacked direction (i.e., X-axis direction) of the battery cells 1. The bypass portion 24N of the second bus bar 20N extends inward from an end on the inner side of the flat portion 22 in the width direction (i.e., Y-axis direction) of the battery cell 1 at an end of the body 21 adjacent to the first bus bar 20P.

As described above, the bypass portion 24P of the first bus bar 20P extends in the longitudinal direction (i.e., X-axis direction) beyond the end of the body 21 adjacent to the second bus bar 20N, and the bypass portion 24N of the second bus bar 20N extends inward along the width direction (i.e., Y-axis direction) of the battery cells 1, for example. Accordingly, the bypass portion 24P of the first bus bar 20P and the bypass portion 24N of the second bus bar 20N are in contact with each other while overlapping at the mechanical joint portion M in the height direction (i.e., Z-axis direction) of the battery cells 1. It is acceptable as long as at least one of the bypass portion 24P of the first bus bar 20P or the bypass portion 24N of the second bus bar 20N extends in the longitudinal direction beyond an end of its body 21 that is adjacent to an end of the body 21 on the other side, and the bypass portion 24P of the first bus bar 20P and the bypass portion 24N of the second bus bar 20N overlap at the mechanical joint portion M in the height direction (i.e., Z-axis direction) of the battery cells 1.

The mechanical joint portion M includes, for example, a bolt m1 and a nut m3 that are adapted to fasten and connect the first bus bar 20P and the second bus bar 20N together. The mechanical joint portion M may also include a washer m2 arranged between the bolt m1 and the nut m3 and the bypass portions 24P and 24N. Each of the bypass portion 24P of the first bus bar 20P and the bypass portion 24N of the second bus bar 20N has a through-hole 24a for passing the bolt m1 of the mechanical joint portion M at the position of overlap in the height direction (i.e., Z-axis direction) of the battery cells 1. The nut m3 is arranged on a face of the bypass portion 24N of the second bus bar 20N facing the battery cell 1, for example.

The mechanical joint portion M is adapted to connect the first bus bar 20P and the second bus bar 20N by, for example, screwing the bolt m1, which has been inserted through the through-holes 24a of the bypass portions 24P and 24N, into the nut m3, and fastening the bypass portions 24P and 24N together with the bolt m1 and the nut m3. Accordingly, the first bus bar 20P of one of the battery groups 10 that are adjacent to each other in the stacked direction and the second bus bar 20N of the other battery group 10 are electrically connected via the mechanical joint portion M. Further, the first bus bar 20P of one of the mutually adjacent battery groups 10 is connected to the second bus bar 20N of the other battery group 10 via the mechanical joint portion M sequentially from one end to the other end of the battery groups 10 in the stacked direction, so that all of the battery groups 10 are connected in series.

The first bus bar 20P and the second bus bar 20N respectively have bent portions 25 between their bypass portions 24P and 24N and the flat portions 22. Each bent portion 25 is bent at an angle of about 90 degrees, for example, from an end on the inner side of the flat portion 22 in the width direction (i.e., Y-axis direction) of the battery cells 1, in the thickness direction of the flat portion 22, that is, in the height direction (i.e., Z-axis direction) of the battery cells 1 and a direction opposite to the battery cells 1. In addition, each bent portion 25 is also bent at an angle of about 90 degrees, for example, toward the battery cells 1 from an end on the outer side of the bypass portion 24P or 24N in the width direction (i.e., Y-axis direction) of the battery cells 1, in the thickness direction of the bypass portion 24P or 24N, that is, in the height direction (i.e., Z-axis direction) of the battery cells 1.

It should be noted that the first end bus bar 20PE and the second end bus bar 20NE of the battery groups 10 arranged at opposite ends in the stacked direction (i.e., X-axis direction) have configurations similar to the first bus bar 20P and the second bus bar 20N except that they have no bypass portion 24P or 24N. In addition, the first end bus bar 20PE and the second end bus bar 20NE may have extension portions partially forming module terminals 101P and 101N of the positive electrode and the negative electrode, respectively, of the battery module 100.

As illustrated in FIG. 1, the housing 30 is in the shape of a generally rectangular parallelepiped having a longitudinal direction along the thickness direction (i.e., X-axis direction) of the battery cells 1, and holds the plurality of battery cells 1 of the battery groups 10. More specifically, the housing 30 includes a plurality of cell holders 31, a pair of end plates 32, a pair of side frames 33, insulation covers 34, and a module cover (not illustrated), for example.

The cell holders 31 are formed of a resin material, such as polybutylene terephthalate (PBT), for example. The cell holders 31 are provided between the mutually adjacent battery cells 1 of the plurality of battery cells 1 stacked in the thickness direction (i.e., X-axis direction), for example, and hold the individual battery cells 1 from their opposite sides in the thickness direction (i.e., X-axis direction). In the stacked direction (i.e., X-axis direction) of the plurality of battery cells 1 of the battery groups 10, a pair of cell holders 31 arranged on the opposite sides of the battery groups 10 are provided with the module terminals 101P and 101N, respectively, that are the external terminals of the battery module 100, for example.

The pair of end plates 32 are plate-like metal members, for example. The pair of end plates 32 are arranged at opposite ends of the battery groups 10 with interposed therebetween the pair of cell holders 31, which are arranged on the opposite sides of the battery groups 10, in the stacked direction (i.e., X-axis direction) of the plurality of battery cells 1 of the battery groups 10. One face of each of the pair of end plates 32 faces the plurality of battery cells 1 held by the cell holders 31 so as to sandwich them.

The pair of side frames 33 are arranged on the opposite sides of the plurality of battery cells 1 of the battery groups 10 in the width direction (i.e., Y-axis direction) with the cell holders 31 interposed therebetween. The pair of side frames 33 are metal members in a generally rectangular frame shape, for example, and are arranged facing the opposite sides of the battery cells 1 in the width direction (i.e., Y-axis direction). Each of the pair of side frames 33 is in a generally rectangular frame shape, for example, and has a long-side direction, that is, a longitudinal direction along the stacked direction (i.e., X-axis direction) of the plurality of battery cells 1 of the battery groups 10, and has a short-side direction, that is, a short direction along the height direction (i.e., Z-axis direction) of the plurality of battery cells 1 of the battery groups 10. The opposite ends of the pair of side frames 33 in the longitudinal direction are fastened to the pair of end plates 32 with fastening members, such as rivets or bolts, for example, and the inner side of the pair of side frames 33 engages with projections provided on the plurality of cell holders 31.

Each insulation cover 34 is a plate-like resin member, such as PBT, having an electrical insulating property, for example, and is arranged facing the upper end face, which is the narrow side face, of each battery cell container 3 provided with the positive electrode terminal 2P and the negative electrode terminal 2N of the battery cell 1. The insulation cover 34 has an opening for exposing the upper end faces of the positive electrode terminals 2P and the negative electrode terminals 2N of the plurality of battery cells 1, and also has partition walls for insulating the positive electrode terminals 2P or the negative electrode terminals 2N of the mutually adjacent battery cells 1 as well as insulating the first bus bar 20P and the second bus bar 20N that are adjacent to each other. The partitions walls of the insulation cover 34 are provided to surround the positive electrode terminals 2P and the negative electrode terminals 2N of the battery cells 1 as well as the first bus bars 20P and the second bus bars 20N, for example. In addition, the insulation cover 34 has disposed thereon various electric wires connected to the battery cells 1 and the circuit board.

The circuit board (not illustrated) is disposed between each insulation cover 34 and the module cover (not illustrated), that is, on the side of the insulation cover 34 opposite to the battery cells 1 in the height direction of the housing 30, and is connected to the first bus bars 20P and the second bus bars 20N via electric wires, for example. The module cover (not illustrated) is a plate-like resin member, such as PBT, having an electrical insulating property, for example. The module cover is disposed to cover each insulation cover 34 and the circuit board at the upper end of the housing 30 on the side opposite to the battery cells 1 in the height direction (i.e., Z-axis direction) of the housing 30.

Hereinafter, the function of the battery module 100 of the present embodiment will be described.

As described above, the battery module 100 includes the plurality of battery groups 10. Each battery group 10 includes the plurality of battery cells 1, and the first bus bar 20P and the second bus bar 20N adapted to connect the plurality of battery cells 1 in parallel. Each battery cell 1 includes the positive electrode terminal 2P mainly containing aluminum and the negative electrode terminal 2N mainly containing copper. The first bus bar 20P mainly contains aluminum and is connected to the positive electrode terminals 2P of the plurality of battery cells 1 of each battery group 10 via the welding joint portions W1. The second bus bar 20N mainly contains copper and is connected to the negative electrode terminals 2N of the plurality of battery cells 1 of each battery group 10 via the welding joint portions W2. The plurality of battery groups 10 are connected in series as a result of the first bus bar 20P of one of the mutually adjacent battery groups 10 being connected to the second bus bar 20N of the other battery group 10 via the mechanical joint portion M.

According to such a configuration, power can be supplied from an external device, such as a power generator, to the plurality of battery cells 1 of the battery module 100 via the module terminals 101P and 101N, the first end bus bar 20PE and the second end bus bar 20NE, and the first bus bar 20P and the second bus bar 20N, for example, so that the plurality of battery cells 1 of each battery group 10 can be charged. It is also possible to supply power stored in the plurality of battery cells 1 of each battery group 10 to an external device, such as a motor, via the first bus bar 20P and the second bus bar 20N, the first end bus bar 20PE and the second end bus bar 20NE, and the module terminals 101P and 101N.

According to such a configuration, the plurality of battery cells 1 of a single battery group 10 can be connected in parallel by a single first bus bar 20P or first end bus bar 20PE mainly containing aluminum and by a single second bus bar 20N or second end bus bar 20NE mainly containing copper, via the plurality of welding joint portions W1 and W2 each adapted to weld similar metals together. In addition, as the first bus bar 20P and the second bus bar 20N mainly containing dissimilar metals are connected via the mechanical joint portion M, the plurality of battery groups 10 can be connected in series without using a clad material and thus avoiding dissimilar metal welding.

That is, the present embodiment can provide the battery module 100 including the plurality of battery groups 10 each having the plurality of battery cells 1 connected in parallel, the plurality of battery groups 10 being connected in series by the first bus bar 20P and the second bus bar 20N, for which a clad material is not used and thus dissimilar metal welding can be avoided. In addition, according to the battery module 100 of the present embodiment, releasing the joining at the mechanical joint portion M allows for replacement in units of the battery groups 10 and also allows for connection of a voltage sensing wire and the like to the mechanical joint portion M.

In the battery module 100, each battery cell 1 has a flat rectangular shape, and has the positive electrode terminal 2P and the negative electrode terminal 2N arranged at opposite ends in the width direction (i.e., Y-axis direction) orthogonal to the thickness direction (i.e., X-axis direction) on an end face of the battery cell 1 along the thickness direction. The plurality of battery cells 1 of each battery group 10 are stacked and arranged in the same orientation along the thickness direction (i.e., X-axis direction) such that the plurality of positive electrode terminals 2P and the plurality of negative electrode terminals 2N are each aligned along the thickness direction (i.e., X-axis direction). Meanwhile, the plurality of battery groups 10 are stacked and arranged while being alternately inverted along the thickness direction (i.e., X-axis direction) such that the plurality of positive electrode terminals 2P and the plurality of negative electrode terminals 2N are alternately arranged in the thickness direction (i.e., X-axis direction).

According to such a configuration, the plurality of battery cells 1 can be connected in parallel by a single first bus bar 20P and a single second bus bar 20N. Thus, the productivity of the battery module 100 can be can increased. In addition, sequentially connecting the first bus bar 20P of one of the mutually adjacent battery groups 10 to the second bus bar 20N of the other battery group 10 via the mechanical joint portion M allows the plurality of battery groups 10 to be connected in series. That is, as the first bus bar 20P and the second bus bar 20N, which are longer than the conventional bus bars and contain dissimilar materials, are connected via the mechanical joint portion M, there is no need to form the first bus bar 20P and the second bus bar 20N as a single thin and elongated clad material. This can avoid the problems in production and cost associated with the use of a special clad material that is longer than the conventional bus bars.

In the battery module 100, each of the first bus bar 20P and the second bus bar 20N has a plate-like shape having a longitudinal direction along the thickness direction (i.e., X-axis direction) of the battery cells 1 and having a short direction along the width direction (i.e., Y-axis direction) of the battery cells 1. The first bus bar 20P and the second bus bar 20N are connected to end faces of the plurality of positive electrode terminals 2P and end faces of the plurality of negative electrode terminals 2N via the welding joint portions W1 and W2, respectively, in the height direction (i.e., Z-axis direction) orthogonal to the thickness direction (i.e., X-axis direction) and the width direction (i.e., Y-axis direction) of the battery cells 1, and have the mechanical joint portion M at their ends adjacent to each other in the longitudinal direction.

According to such a configuration, a single first bus bar 20P is arranged above the plurality of positive electrode terminals 2P of the plurality of battery cells 1, and a single second bus bar 20N is arranged above the plurality of negative electrode terminals 2N of the plurality of battery cells 1, and then, the welding joint portions W1 and W2 can be easily formed at a time by laser welding, for example. In addition, contact areas can be secured between the first bus bar 20P and the positive electrode terminals 2P of the battery cells 1 and between the second bus bar 20N and the negative electrode terminals 2N of the battery cells 1. Further, in comparison with when individual bus bars, which are connected to external terminals of individual battery cells of a battery group, are connected one by one, it is only necessary to connect the mutually adjacent battery groups 10 via the mechanical joint portion M. Thus, the number of parts and the number of joint portions can be reduced. Thus, the productivity of the battery module 100 can be increased.

Further, since each of the first bus bar 20P and the second bus bar 20N has the curved portions 23, the elasticity of each of the first bus bar 20P and the second bus bar 20N in the height direction (i.e., Z-axis direction) of the battery cells 1 can be increased. Accordingly, pressing the first bus bar 20P and the second bus bar 20N against the positive electrode terminals 2P and the negative electrode terminals 2N, respectively, of the plurality of battery cells 1 allows the first bus bar 20P and the second bus bar 20N to elastically deform in the height direction (i.e., Z-axis direction) of the battery cells 1. This allows the first bus bar 20P and the second bus bar 20N to more reliably contact the positive electrode terminals 2P and the negative electrode terminals 2N, respectively, of the plurality of battery cells 1, and thus increases the connection reliability of the plurality of battery cells 1.

In the battery module 100 of the present embodiment, the first bus bar 20P and the second bus bar 20N have the bypass portions 24P and 24N, respectively, which extend inward along the width direction (i.e., Y-axis direction) of the battery cells 1, at their ends adjacent to each other in the longitudinal direction (i.e., X-axis direction). In addition, the first bus bar 20P and the second bus bar 20N are connected via the mechanical joint portion M at their bypass portions 24P and 24N.

Such a configuration can secure a space for disposing the mechanical joint portion M without preventing a reduction in the size of the battery module 100. Therefore, not only can fastening members, such as the bolt m1 and the nut m3, be disposed, but also a space for disposing a jig or a probe that is necessary to form the welding joint portions W1 and W2 can be secured, for example. In addition, a sufficient contact area between the first bus bar 20P and the second bus bar 20N can be secured. Further, as the first bus bar 20P and the second bus bar 20N have the bypass portions 24P and 24N, respectively, stress applied to each portion of the battery module 100 can be relaxed.

More specifically, for example, forces are applied to the first bus bar 20P and the second bus bar 20N due to steps resulting from the dimensional tolerance of each portion of the battery module 100 or due to impact or vibration applied to the battery module 100. In addition, as the number of battery cells 1 over which the first bus bar 20P and the second bus bar 20N extend is greater and as the first bus bar 20P and the second bus bar 20N are longer, forces applied to the first bus bar 20P and the second bus bar 20N become greater.

However, as the first bus bar 20P and the second bus bar 20N have the bypass portions 24P and 24N, respectively, stress applied to each portion of the battery module 100 can be relaxed. Herein, relaxation of stress by the bypass portions 24P and 24N includes dispersion of the stress concentration portion for each portion of the battery module 100 and relaxation of stress applied to each portion due to the first bus bar 20P and the second bus bar 20N being deformed within the elastic range.

In the battery module 100 of the present embodiment, at least one of the bypass portion 24P of the first bus bar 20P or the bypass portion 24N of the second bus bar 20N extends in the longitudinal direction beyond an end of the first bus bar 20P or the second bus bar 20N in the longitudinal direction. In addition, the bypass portion 24P of the first bus bar 20P and the bypass portion 24N of the second bus bar 20N overlap with each other at the mechanical joint portion M in the height direction (i.e., Z-axis direction) of the battery cells 1.

Such a configuration can secure a sufficient contact area between the bypass portion 24P of the first bus bar 20P and the bypass portion 24N of the second bus bar 20N, and thus can increase the reliability of connection between the first bus bar 20P and the second bus bar 20N via the mechanical joint portion M. In addition, it is possible to suppress an increase in the dimension of the battery module 100 in the height direction (i.e., Z-axis direction) of the battery cells 1, and thus can achieve a reduction in the size of the battery module 100.

In the battery module 100 of the present embodiment, the mechanical joint portion M includes the bolt m1 and the nut m3 that are adapted to fasten and connect the first bus bar 20P and the second bus bar 20N together. Accordingly, it is possible to allow the bolt m1 to penetrate through the first bus bar 20P and the second bus bar 20N and be screwed into the nut m3, and then fasten the bolt m1 and the nut m3 together, thereby forming the mechanical joint portion M between the first bus bar 20P and the second bus bar 20N. It should be noted that the configuration of the mechanical joint portion M is not limited to the one including the bolt m1 and the nut m3.

Figure 8B:
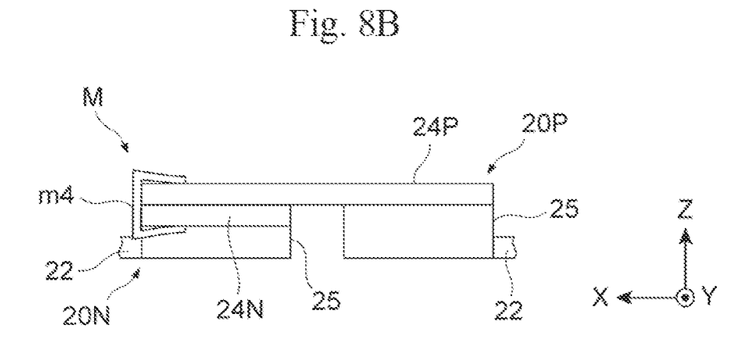
FIG. 8B is a side view illustrating a variation of the mechanical joint portion illustrated in FIG. 8A.
Figure 8C:
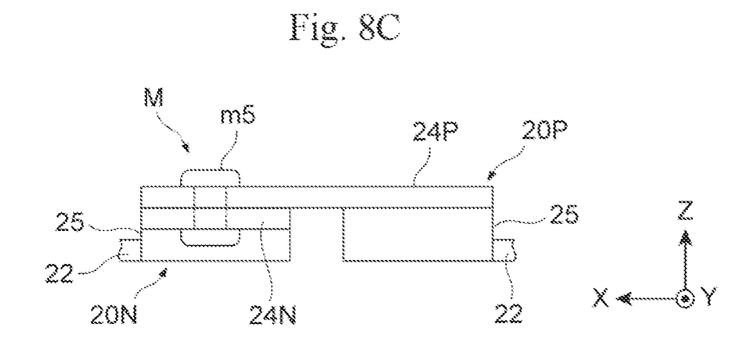
FIG. 8C is a side view illustrating a variation of the mechanical joint portion illustrated in FIG. 8A.

FIGS. 8B and 8C are side views each illustrating a variation of the mechanical joint portion M illustrated in FIG. 8A. As illustrated in FIG. 8B, the mechanical joint portion M of the battery module 100 may include a clip m4 adapted to hold and connect the first bus bar 20P and the second bus bar 20N together. Alternatively, as illustrated in FIG. 8C, the mechanical joint portion M may include a rivet m5 adapted to connect the first bus bar 20P and the second bus bar 20N together by penetrating through the first bus bar 20P and the second bus bar 20N and thus undergoing plastic deformation. Such variations can also achieve advantageous effects similar to those of the mechanical joint portion M illustrated in FIG. 8A.

As described above, according to the present embodiment, the plurality of battery cells 1 of a single battery group 10 can be connected in parallel by a single first bus bar 20P mainly containing aluminum and a single second bus bar 20N mainly containing copper, via the plurality of welding joint portions W1 and W2 each adapted to weld similar metals together. In addition, the first bus bar 20P and the second bus bar 20N mainly containing dissimilar metals are connected via the mechanical joint portion M. Thus, it is possible to connect the plurality of battery groups 10 in series without using a clad material and thus avoiding dissimilar metal welding. That is, the present embodiment can provide the battery module 100 including the plurality of battery groups 10 each having the plurality of battery cells 1 connected in parallel, the plurality of battery groups 10 being connected in series by the first bus bar 20P and the second bus bar 20N, for which a clad material is not used and thus dissimilar metal welding can be avoided.

Although the embodiments of the present disclosure have been described in detail above with reference to the drawings, specific configurations are not limited thereto, and any designs changes that are within the spirit and scope of the present invention are included in the present disclosure.

REFERENCE SIGNS LIST

1 Battery cell
2P Positive electrode terminal
2N Negative electrode terminal
10 Battery group
20P First bus bar
20N Second bus bar
24P Bypass portion
24N Bypass portion
100 Battery module
M Mechanical joint portion
m1 Bolt
m3 Nut
m4 Clip
m5 Rivet
W1 Welding joint portion
W2 Welding joint portion

The invention claimed is:

1. A battery module comprising: a plurality of battery groups, wherein: each battery group includes a plurality of battery cells, a first bus bar, and a second bus bar, the first bus bar and the second bus bar being configured to connect the plurality of battery cells in parallel, each battery cell includes a positive electrode terminal mainly containing aluminum and a negative electrode terminal mainly containing copper, the first bus bar mainly contains aluminum and is connected to the positive electrode terminals of the plurality of battery cells of each battery group via welding joint portions, the second bus bar mainly contains copper and is connected to the negative electrode terminals of the plurality of battery cells of each battery group via welding joint portions, and the plurality of battery groups are connected in series as a result of a first bus bar of one of mutually adjacent battery groups being connected to a second bus bar via a mechanical joint portion, wherein the mechanical joint portion includes a rivet adapted to connect the first bus bar and the second bus bar together by penetrating through the first bus bar and the second bus bar and thus undergoing plastic deformation.

2. The battery module according to claim 1, wherein:
each battery cell has a flat rectangular shape, and has the positive electrode terminal and the negative electrode terminal arranged at opposite ends in a width direction orthogonal to a thickness direction on an end face of the battery cell along the thickness direction,
the plurality of battery cells of each battery group are stacked and arranged in the same orientation along the thickness direction such that the plurality of positive electrode terminals are aligned in the thickness direction and the plurality of negative electrode terminals are aligned in the thickness direction, and
the plurality of battery groups are stacked and arranged while being alternately inverted along the thickness direction such that the plurality of positive electrode terminals and the plurality of negative electrode terminals are alternately arranged along the thickness direction.

3. The battery module according to claim 2, wherein:
each of the first bus bar and the second bus bar has a plate-like shape having a longitudinal direction along the thickness direction and having a short direction along the width direction, and
the first bus bar and the second bus bar are respectively connected to end faces of the plurality of positive electrode terminals and end faces of the plurality of negative electrode terminals via the respective welding joint portions in a height direction of the battery cells orthogonal to the thickness direction and the width direction, and have a mechanical joint portion at ends of the first bus bar and the second bus bar that are adjacent to each other in the longitudinal direction.

4. The battery module according to claim 3, wherein:
the first bus bar and the second bus bar have bypass portions, respectively, at ends of the first bus bar and the second bus bar adjacent to each other in the longitudinal direction, the bypass portions extending inward along the width direction of the battery cells, and
the first bus bar and the second bus bar are connected via the mechanical joint portion M at the respective bypass portions.

5. The battery module according to claim 4, wherein at least one of the bypass portion of the first bus bar or the bypass portion of the second bus bar extends in the longitudinal direction beyond the end of the first bus bar or the second bus bar, and the two bypass portions overlap with each other at the mechanical joint portion in the height direction.

6. The battery module according to claim 1, wherein the mechanical joint portion includes a bolt and a nut that are adapted to fasten and connect the first bus bar and the second bus bar together.

7. The battery module according to claim 1, wherein the mechanical joint portion includes a clip adapted to hold and connect the first bus bar and the second bus bar together.

8. The battery module according to claim 1, wherein the mechanical joint portion is a reusable fastener.

* * * * *